(12) United States Patent
Schubert

(10) Patent No.: US 8,252,458 B2
(45) Date of Patent: Aug. 28, 2012

(54) ELECTROLYTE-ABSORING, NON-PERMEABLE SEALING MATERIALS

(75) Inventor: Mark A. Schubert, Medina, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1133 days.

(21) Appl. No.: 12/125,142

(22) Filed: May 22, 2008

(65) Prior Publication Data

US 2008/0226982 A1    Sep. 18, 2008

Related U.S. Application Data

(63) Continuation-in-part of application No. 10/856,189, filed on May 28, 2004, now Pat. No. 7,670,715, and a continuation-in-part of application No. 10/682,223, filed on Oct. 9, 2003, now Pat. No. 7,923,137.

(51) Int. Cl.
*H01M 2/08* (2006.01)
*H01M 4/00* (2006.01)
*H01M 4/13* (2010.01)
*H01M 6/16* (2006.01)

(52) U.S. Cl. ............ 429/185; 429/221; 429/231.95; 429/326; 429/324

(58) Field of Classification Search ......... 429/185, 429/221, 231.95, 326, 324
See application file for complete search history.

(56) References Cited

U.S. PATENT DOCUMENTS

| | | |
|---|---|---|
| 3,647,557 A | 3/1972 | Kegelman |
| 4,008,354 A | 2/1977 | Fitchman et al. |
| 4,048,392 A | 9/1977 | Garoutte |
| 4,166,157 A | 8/1979 | McCormick |
| 4,329,405 A | 5/1982 | Zupancic |
| 4,333,995 A | 6/1982 | Ishida et al. |
| 4,437,231 A | 3/1984 | Zupancic |
| 4,451,542 A | 5/1984 | Ishida et al. |
| 4,482,613 A | 11/1984 | Turchan et al. |
| 4,501,805 A | 2/1985 | Yasuda et al. |
| 4,529,673 A | 7/1985 | Zupancic |
| 4,580,790 A | 4/1986 | Doose |
| 4,592,970 A | 6/1986 | Zupancic |
| 4,623,599 A | 11/1986 | Vourlis |
| 4,725,515 A | 2/1988 | Jurca |
| 4,804,595 A | 2/1989 | Bakos et al. |
| 4,931,368 A | 6/1990 | Ayers et al. |
| 5,015,542 A | 5/1991 | Chaney et al. |

(Continued)

FOREIGN PATENT DOCUMENTS

EP    0377501 A2    7/1990

(Continued)

OTHER PUBLICATIONS

Oleesky, et al., "Reinforcing Materials and Fillers," Handbook of Reinforced Plastics, Reinhold Publishing Corporation, 1964, pp. 120, 194-209.

(Continued)

*Primary Examiner* — Helen O Conley
(74) *Attorney, Agent, or Firm* — Robert C. Baraona

(57) ABSTRACT

An engineered thermoplastic sealing member for $LiFeS_2$ and other nonaqueous cells is disclosed. The optimal material displays a propensity to absorb at least 10 weight percent of an ether-based electrolyte while, at the same time, displaying a vapor transmission rate of less than $500((g \times mil)/(100\ in^2 \times days))$.

6 Claims, 6 Drawing Sheets

U.S. PATENT DOCUMENTS

| | | |
|---|---|---|
| 5,183,594 A | 2/1993 | Yoshinaka et al. |
| 5,236,205 A | 8/1993 | Chen et al. |
| 5,290,414 A | 3/1994 | Marple |
| 5,462,820 A | 10/1995 | Tanaka |
| 5,624,771 A | 4/1997 | Sano et al. |
| 5,656,392 A | 8/1997 | Sano et al. |
| 5,691,083 A | 11/1997 | Bolster |
| 5,821,008 A | 10/1998 | Harada et al. |
| 6,025,091 A | 2/2000 | Kondo et al. |
| 6,468,691 B1 | 10/2002 | Malay et al. |
| 6,489,062 B1 | 12/2002 | Watanabe et al. |
| 6,849,360 B2 | 2/2005 | Marple |
| 7,157,185 B2 | 1/2007 | Marple |
| 2002/0068221 A1 | 6/2002 | Watanabe et al. |
| 2002/0127467 A1 | 9/2002 | Watanabe et al. |
| 2003/0118902 A1 | 6/2003 | Ray et al. |
| 2005/0112462 A1 | 5/2005 | Marple |
| 2005/0244706 A1 | 11/2005 | Wu et al. |

FOREIGN PATENT DOCUMENTS

| | | | |
|---|---|---|---|
| EP | 0975042 A1 | | 1/2000 |
| EP | 1035598 A1 | | 9/2000 |
| EP | 1102336 B1 | | 5/2001 |
| GB | 1452147 A | | 10/1976 |
| GB | 2149198 A | | 6/1985 |
| JP | 55111063 A | | 8/1980 |
| JP | 1996138686 A | | 5/1996 |
| JP | 1996321287 A | | 12/1996 |
| JP | 1998097852 A | | 4/1998 |
| JP | 10302739 A | | 11/1998 |
| JP | 1998302740 A | | 11/1998 |
| JP | 200048803 A | | 2/2000 |
| JP | 2000327903 A | | 11/2000 |
| JP | 2001-085065 | * | 3/2001 |
| JP | 2001196038 A | | 7/2001 |

OTHER PUBLICATIONS

Dostal, et al., "Engineering Plastics," Engineered Materials Handbook, vol. 2, ASM International, 1988, pp. 16.

* cited by examiner

ELECTROLYTE-ABSORING, NON-PERMEABLE SEALING MATERIALS

CROSS REFERENCE TO RELATED APPLICATIONS

This application is a continuation-in-part of U.S. patent application Ser. No. 10/682,223, currently U.S. Pat. No. 7,923,137, filed on Oct. 9, 2003 and Ser. No. 10/856,189, currently U.S. Pat. No. 7,670,715, filed on May 28, 2004, both entitled "Nonaqueous Cell with Improved Thermoplastic Sealing Member" and both currently pending before the United States Patent and Trademark Office ("Parent Applications").

BACKGROUND OF INVENTION

This invention relates to the field of engineered thermoplastic sealing members for electrochemical cells and, more particularly, to a novel engineered thermoplastic sealing member with an affinity for absorbing electrolyte but possesses low vapor transmission (i.e., permeation) of that electrolyte through the sealing member. As used herein, the term "engineered thermoplastic" contemplates the type of materials described in Volume 2 of the Engineered Materials Handbook, first published by ASM International in 1988, and specifically includes all thermoplastics, with or without fillers or reinforcers (such as acrylonitrile-butadiene-sytrene, acetal, acrylic, fluorocarbon, nylon, phenoxy, polybutylene, polyaryl ether, polycarbonate, chlorinated polyethers, polyether sulfone, polyphenylene oxide, polysulfone, polyimide, rigid polyvinyl chloride, polyphenylene sulfide, thermoplastic urethane elastomers and other similar reinforced plastics), that have sufficient mechanical, chemical and thermal properties necessary to withstand exposure to non-aqueous organic solvents at temperature extremes potentially as great as −55° C. to 85° C. over a period of time that may be as long as 10-15 years and all without degradation that would comprise the material's ability to act as a hermetic seal for a battery housing.

The ability to withstand extreme temperature conditions, including thermal cycling and thermal shock between high and low temperatures, is becoming more important for nonaqueous cells, particularly in consumer-sized lithium batteries (e.g., International Electrotechnical Commision sizes FR6 or FR03). Specifically, transportation regulations limit total weight loss of such batteries to fractional percentages of the battery's original weight after being subjected to certain tests/conditions. However, such weight loss is typically, if not entirely, attributed to vapor transmission of the volatile non-aqueous electrolytes through and/or around the sealing mechanism(s) utilized by that housing. Not surprisingly, the more volatile the electrolyte, the greater the need for effective sealing.

In response, a wide variety of cell designs have been developed for effectively sealing nonaqueous cells. The design depends, at least in part, on the size of the cell, the type of electrode and electrolyte materials used in the cell and the power requirements of the devices to be powered by the cell. Because the cathode/electrolyte materials are so reactive, lithium cells with large liquid cathode (e.g., lithium-sulfur dioxide ($Li/SO_2$) and lithium-thionyl chloride ($Li/SOCl_2$)) often have housings in which metal components are hermetically welded, and glass seals are used to seal metal components that must be electrically insulated and to seal small apertures in the housings. These types of housings tend to be expensive due to the materials and the manufacturing processes and equipment required. As such, these solutions have little bearing on consumer battery systems, where cost and ease of manufacture are two of the most prominent motivations in cell design.

Other, less complex means are used to seal cells that utilize solid electrodes, including consumer-sized lithium batteries, with the more recent trend being toward engineered plastics in place of less refined or more common materials in order to improve sealing performance. Because of its relatively low cost and ease of manufacture, thermoplastic seal members are often used to effect a seal between rigid components of the cell housing (i.e., the container and closure). For example, a thermoplastic gasket or grommet can be compressed between the inside top edge of the cell container (e.g., a steel can) and the periphery of the cover which forms the closure over the open top of the can. Hermetic sealing of the container is important both to keep the active materials and electrolyte within the cell housing, as well as to keep water out.

Thermoplastic seals may also be used to effect a hermetic seal of the safety vent aperture(s) in the cell housing. Here, a conforming thermoplastic seal plugs the vent hole. Alternatively, the plug may be a rigid material, such as a glass or metal ball blocking the opening of a cylindrical thermoplastic bushing which lines the interior of the vent hole. In either case, the thermoplastic seal functions as a pressure relief vent for the cell. These arrangements are also desirable because electrolyte may be dispensed into the cell through the vent hole after the cover has already been sealed to the battery housing. Other designs which utilize a thermoplastic member to form a compressive seal between rigid parts of a rupturable vent are also possible.

FIG. 1 shows an example of a cylindrical lithium battery 10 that is common to lithium-iron disulfide cells and/or other lithium cell types (e.g., lithium-manganese dioxide, etc.). Notably, the cell design shown in FIG. 1 is also applicable to certain embodiments of the invention described herein. This design has two thermoplastic seal members—gasket 16, which in combination with top cover 40 encloses in the open end of can 12, and bushing 34, which in combination with vent ball 32 encloses vent aperture 30. Both thermoplastic seal members provide a compressive seal. Since the can 12 and cover 40 are electrically connected to opposite electrodes within the cell, gasket 16 must also provide electrical insulation between the top cover 40 and the can 12. The bushing 34 and vent ball 32 comprise a pressure relief vent for the cell. When the internal cell pressure exceeds a predetermined abnormally high level, the vent ball 32 (and sometimes the bushing 34) are forced out of the vent aperture 30, leaving an opening through which pressure is released. Cells sealed with both a gasket between the can and cover and a pressure relief vent comprising a bushing and vent plug disposed in an aperture in the cell cover are disclosed in U.S. Pat. No. 4,329,405 (issued May 11, 1982), U.S. Pat. No. 4,437,231 (issued Mar. 20, 1984), U.S. Pat. No. 4,529,673 (issued Jul. 16, 1985), U.S. Pat. No. 4,592,970 (issued Jun. 3, 1986), U.S. Pat. No. 4,927,720 (issued May 22, 1990) and U.S. Pat. No. 4,931,368 (issued Jun. 5, 1990) and U.S. Pat. No. 5,015,542 (issued May 14, 1991), the entire disclosures of which are incorporated herein.

For any cell type, the seal member material must be such that a suitable seal is maintained for an acceptable period of time and under the temperature conditions that the cell is expected to withstand during transportation, storage and use. Common characteristics of a good seal member include stability of the material in the internal cell and external environments, impermeability to the liquids and gases that are to be sealed within or outside the cell, and the formation and maintenance of a complete seal path (i.e., with no voids or gaps) at each seal interface. As noted above, consumer non-aqueous batteries are often expected to deliver service at temperatures as low as 0° C., and sometimes even as low as −40° C. or −55° C. Additionally, these cells often experience high temperatures exceeding 40° C. or, more often than not, 71° C. and higher. Thus, the seal must maintain its physical shape and integrity, while remaining non-reactive with the organic solvents, solutes and electrochemically active materials (e.g., iron disulfide, lithium, etc.), across that entire range of temperatures.

Compressibility of the seal is significant in order to allow for slight variations in manufacturing and/or component tolerances. As a result, the material used in a seal should have sufficient compressibility that can be maintained for a prolonged period of time. However, some thermoplastic materials under compressive stress tend to flow to relieve that stress. This is referred to as stress relaxation or "cold flow" of the material. Furthermore, thermoplastic materials tend to exhibit even greater stress relaxation at higher temperatures, thereby reducing the time that sufficient compression can be maintained.

Temperature also affects the compression of thermoplastic materials in another way. Different materials will expand and contract by different amounts in response to increases and decreases, respectively, in ambient temperature. Therefore, thermoplastics used to form compressive seals between more rigid components (e.g., a metal can and a metal cover) should expand and contract at close to the same rate as the rigid materials in order to maintain sufficient gasket compression over the greatest temperature range possible. If the thermoplastic is used as a compressive seal and it has a diverging coefficients of thermal expansion as compared to the rigid components in contact with the seal, unwanted gaps may form between the seal and rigid members, resulting in leaking and potential weight loss.

Thermoplastic materials available for use in nonaqueous cell seal members are more limited than for aqueous cells. Specifically, the active materials in nonaqueous cells are very reactive with water, so the seal must prevent water from permeating into the cell (as compared to aqueous cells, where water transport may be less restricted). A seal for a nonaqueous cell must also have a low vapor transmission rate for the electrolyte solvents used in the cell itself. Since the vapor transmission rate of thermoplastic material is generally dependent in part upon the vapor pressure of the solvent, low vapor transmission rates are generally more difficult to achieve for nonaqueous electrolytes containing ethers and/or other organic solvents with low boiling points common to such cell systems. Finally, and most significantly, any thermoplastic must not dissolve or degrade when exposed to the organic solvents commonly used in nonaqueous cells, thereby limiting the number of available material combinations.

Although the prior art generically teaches that a seal member's ability withstand temperature fluctuations can be improved by using engineered thermoplastic materials that maintain dimensional stability and do not crack under extreme temperature conditions, the problem of reducing electrolyte permeation and the rate of transmission of through the gasket is not addressed. This problem, as well as the electrolyte's propensity to absorb into the sealing material, is generally greater at higher temperatures and with more volatile organic solvents with lower boiling points.

Notably, as used throughout this specification, "absorb" and "absorption" refer to a material's propensity to enter into and be held by the sealing material (much as sponge would absorb water). In contrast, "permeation" is the process by which the electrolyte is absorbed into the material and then diffuses through that material such that it is released on the opposite (i.e., non-sealed) side. Numerous references teach that absorption and/or permeation are unwanted characteristics in a sealing material. For example, U.S. Pat. No. 4,333,995 discusses the disadvantages of electrolyte absorption because it causes deterioration of gasket elasticity which, in turn, leads to electrolyte leakage. Similarly, U.S. Pat. No. 5,462,820 recommends polypropylene as a non-aqueous battery gasket material because it does not swell or dissolve in organic solvents, with the swelling presumably an undesirable trait caused by electrolyte absorption.

Polypropylene is commonly used a material for lithium cell (e.g., Li/MnO$_2$ and Li/FeS$_2$) gaskets. Gaskets have been made with other thermoplastic materials for the purpose of improving the ability of the cell to withstand higher temperatures than with polypropylene.

Sano et al., in U.S. Pat. No. 5,624,771, disclose the use of polyphenylene sulfide ("PPS"), rather than PP, as a gasket material for a lithium cell to improve resistance of the cell to high temperatures. PPS was used to reduce gasket deformation due to cold flow under the high compressive load conditions the gasket was subjected to in the cell. However, a blown asphalt sealant was required and glass filler and elastomer content both had to be maintained at less than 10 wt. % of the material in order to prevent leakage of electrolyte through the resulting gaskets.

In U.S. Pat. No. 5,656,392, PPS and tetrafluoride-perfluoroalkyl vinylether copolymer (PFA) are identified as suitable for making a gasket for a cell that is useable at high temperatures. Here again, the addition of a glass fiber filler to the resin (to extend the stability of the gasket configuration) small amounts of PE and/or PP (to extend the temperature range that can be tolerated by the cells on a cyclic thermal shock test) are taught. But as above, gaskets containing more than 10 weight percent glass fiber were undesirable because cells made with such highly filled thermoplastic materials leaked on a temperature cycling test. The addition of more than 10 weight percent of PE and/or PP was also undesirable because of cell leakage and a continuously usable temperature of less than 150° C. for the gasket. The use of an asphalt sealant is also preferred/required.

In U.S. Pat. No. 6,025,091 Kondo et al. disclose a cell with a metal can sealed with a metal terminal cap and a gasket comprising polybutylene terephthalate ("PBT"). The gasket material can be PBT alone, PBT mixed with another polymer or PBT reinforced with inorganic materials such as glass fibers, glass beads and certain organic compounds. Kondo et al. disclose that the invention solves the problems of creeping and cracking of the gasket material when the cell is exposed to high temperature. The preferred cell type was a secondary cell, either with an alkaline or nonaqueous electrolyte (e.g., a lithium ion cell). A particularly preferred electrolyte contained LiCF$_3$SO$_3$, LiClO$_4$, LiBF$_4$ and/or LiPF$_6$ dissolved in a mixed solvent comprising propylene carbonate or ethylene carbonate and 1,2-dimethoxyethane and/or diethyl carbonate and 1,2-dimethoxyethane and/or diethyl carbonate.

In the mid-1980's Union Carbide Corp. also manufactured a 1/3 N size Li/MnO$_2$ cell (Type No. 2L76) with a gasket made from PBT (GAFITE® from GAF Chemicals). These cells had a spiral wound electrode design and contained an electrolyte with comprising a mixture of lithium perchlorate and lithium trifluoromethanesulfonate salts in a solvent containing 50 volume percent each of propylene carbonate and 1,2-dimethoxyethane.

When a pressure relief vent for the cell is incorporated into the seal member, the characteristics of the thermoplastic seal member that affect the operation of the pressure relief vent must also be considered when selecting a suitable thermoplastic resin. Ethylene-tetrafluoroethylene copolymer ("ETFE") is commonly used for vent bushings in consumer Li/FeS$_2$ cells with pressure relief vent designs similar to that in FIG. 1. When the internal cell pressure reaches a predetermined level, the vent ball or the vent ball and the vent bushing are forced outward to create an opening in the cell. When tested on a thermal shock test, ETFE-only bushings can sometimes undergo sufficient stress relaxation to cause a partial or complete loss of compression between the vent ball and cover or cause activation of the pressure relief vent undesirably low internal cell pressures.

Another approach to minimizing weight loss during thermal cycling is through the selection of electrolyte. Both U.S. Pat. Nos. 5,624,771 and 5,656,392 teach that high boiling point solvents, such as γ-butyrolactone (boiling point 202° C.) and propylene carbonate (boiling point 241° C.), can be used as electrolyte solvents to achieve the desired high temperature cell performance, either alone or in combination with the gasket materials mentioned above. Notably, these solvents can maintain practical low temperature (−20° C.) cell operation in a Li/(CF)$_n$ coin cell, and because of their low-volatility, they are at a lesser risk of volatilizing and/or absorbing and permeating through the sealing material (obviously, all solvents contemplated herein will neither absorb nor permeate through the metal container/housing used in nonaqueous-type batteries). However, electrolytes containing a large amount of low boiling point solvents such as these do not perform as well on high power discharge in lithium batteries, which can be a significant disadvantage for high power discharge applications.

SUMMARY OF INVENTION

In view of the advantages described in the Parent Applications, a further examination of the interaction between the selection of electrolyte, the selection of an engineered thermoplastic sealing material and the rate of absorption and permeation thereof was undertaken. It was discovered that impact modified polyphenylene sulfide ("PPS") and polyphthalamide ("PPA") disclosed in the Parent Applications absorb ether-based electrolytes at high temperatures while at the same time remaining resistant to permeation of that electrolyte at high temperatures. In essence, these materials behave like a wine cork, in that they absorb liquid and swell or expand to create a more effective seal, but at the same time they do not allow the liquid to easily permeate through the material. The beneficial effect of the swelling is that it closes off any gaps between the seal and the housing, while the low permeability of the materials safeguard against electrolyte egress (and any ambient fluid ingress, e.g., atmospheric moisture) through the seal material itself. Significantly, the material must display an acceptable level of performance in both regards (i.e., high absorption and low permeation) in order to function as an acceptable sealing material according to this invention. To the extent these properties are not inherent to common thermoplastics, selection of an appropriate engineered thermoplastic is one of the key aspects of this invention.

In order to better demonstrate this so-called "wine cork effect", tests for the equilibrium absorption, nominally at 70° C., and the vapor transmission rate, nominally at 75° C., were developed for specific polymer/liquid combinations. Acceptable parameters for each trait were then defined, with relatively high absorption and low transmission/permeation necessary to impart the desired effect and characteristics for the sealing material. This work was specifically performed on the engineered thermoplastic materials described in the Parent Applications, although it is believed the new characteristics defined herein are equally applicable to other engineered thermoplastics that meet the criteria set forth below.

As a result, an electrochemical cell, a sealing member for such cell and/or a method for making such cells are all contemplated. In each case, the sealing member is made from an engineered thermoplastic resin having an absorption at 71° C. greater than or equal to 10 weight percent and a vapor transmission rate of less than 500 (g×mil)/(100 in$^2$×day), said absorption and vapor transmission rate both relative to the electrolyte consisting essentially of one or more organic solvents and at least one solute dissolved therein, said one or more organic solvents including at least 50 volume percent of one or more ethers.

The sealing member has a tubular, circular shape or is otherwise hollow and cylindrical. Optimally, the sealing member is injection molded and may be cold-crystallized to increase its crystallinity. When incorporated in a cell, the sealing member is disposed between the container/housing and the closure assembly, which may be in the form of a top cover or an assembly including a venting mechanism. Impact modifiers, thermal-stabilizing fillers and judicious selection of resins such PPS (and more ideally PPS with at least 10 weight percent of a thermal stabilizing filler) and PPA (and more ideally PPA with between about 5 to 40 weight percent impact modifiers) can all be selected to achieve the desired levels of absorption and vapor transmission.

The electrolyte is composed from a majority, by volume, of ethers although other organic solvents are contemplated. The electrolyte must have at least one solute dissolved therein. Preferably, the electrolyte includes 90 to 98 volume percent of ethers, such as DIOX, DME, THF and the like.

The preferred cell and battery according to the invention has a lithium-based anode and iron disulfide in the cathode. The cell can be constructed in a spirally wound configuration.

DETAILED DESCRIPTION OF INVENTION

Figure 1:
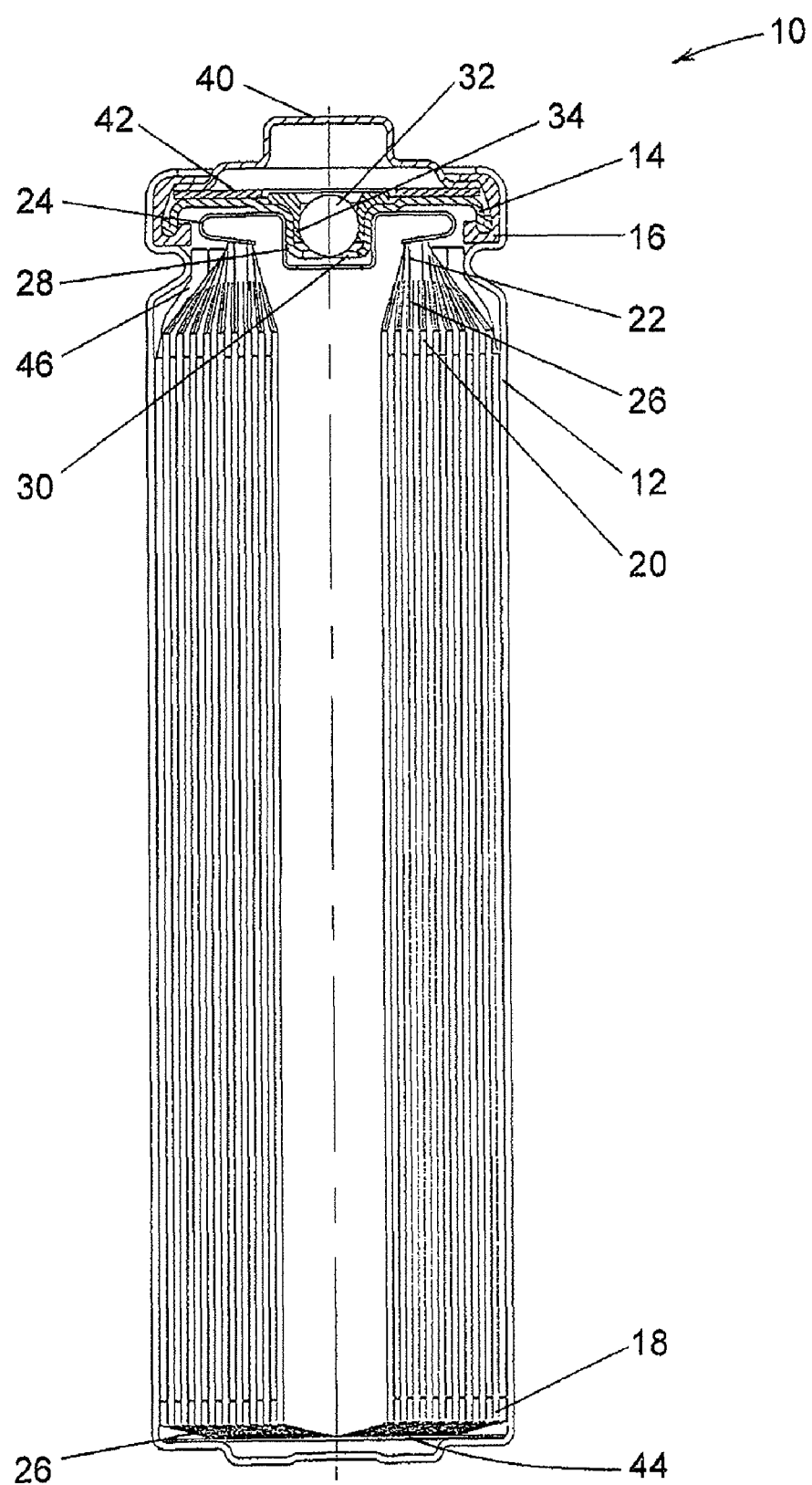
FIG. 1 is a cross-sectional view of a cylindrical electrochemical battery cell, with one thermoplastic seal member between the can and cover and another thermoplastic seal member between the cover and vent ball.

Unless otherwise specified, the following definitions, methods and criteria apply throughout this disclosure:

All disclosed characteristics and ranges are as determined at room temperature (20-25° C.), and boiling points are at one atmosphere pressure;

Aperture means an opening in a material that extends from an area within one surface to an area within an adjacent surface of the material; an open end of a container such as a can or a tube is not an aperture;

Coefficient of thermal expansion is determined in the flow direction between 50° C. and 90° C. according to ASTM E831 and expressed in cm/cm/degree Celsius;

Creep strain rate is determined by Dynamic Mechanical Analysis using a Tritec 2000 DMA from Triton Technologies, Ltd., UK, at a test temperature of 85° C.; resin is compression molded to form a 0.25 mm thick film and cut to a width of 2.3 mm; the initial gauge length is 2.0 mm, a constant tensile force of 6 N is applied to give a constant tensile stress of 10,000 kPa;

Crimp release pressure means the internal cell pressure at which the cell housing deforms sufficiently to break the container/seal member/cell cover seal and release pressure from the cell;

DIOX refers to a dioxolane-based solvent, typically 1,3-dioxolane unless otherwise specified but also including substituted variants of 1,3-dioxolane where appropriate;

DME refers to a dimethoxyethane-based solvent, typically 1,2-dimethoxyethane unless otherwise specified but also including diglyme, triglyme and the like where appropriate;

Electrolyte means a solution containing one or more solutes dissolved within one or more liquid, organic solvents;

Equilibrium Absorption is the percent weight gain that occurs upon submersion into electrolyte, at a given temperature, when the weight gain becomes constant versus time;

Heat deflection temperature is determined at 18.56 kg/cm$^2$ (264 pounds per square inch) according to ASTM D648 and expressed in degrees C.;

Impact modifier means a polymer modifier added primarily to alter the physical and mechanical properties of a thermoplastic material and functioning by absorbing impact energy and dissipating it in a nondestructive fashion; elastomers can be used as impact modifiers, including but not limited to natural rubbers, acrylics and styrenic elastomers, chlorinated polyethylene, EVA copolymers, ethylene-propylene copolymers and terpolymers, polybutadiene and polyisoprene;

Mold shrinkage is determined on a ⅛ inch (3.175 mm) thick specimen according to ASTM D955 and expressed in (inches/inch)×10$^{-3}$ [(mm/mm)×10$^{-3}$];

Thermal-stabilizing filler is a material which, when added to a base resin, will decrease the resin's coefficient of thermal expansion by at least 20 percent and increase the heat deflection temperature by at least 20° C.;

Toughness is determined using a notched Izod impact test according to ASTM D256;

Vapor Transmission Rate ("VTR") is a quantitative measure of a material's permeability at a specified temperature and pressure, expressed as weight loss in grams per unit time and per 100 in$^2$ of surface area, multiplied by the path length for permeation in mils (¹⁄₁₀₀₀ of an inch). The units are expressed as (g×mil)/(days×100 in$^2$);

Venting means the opening of the pressure relief vent of a cell;

Vent pressure means the internal cell pressure at which the pressure relief vent opens to release pressure from the cell;

The invention will be better understood with reference to FIG. 1, which shows an FR6 type cylindrical battery cell having a housing sealed by two thermoplastic seal members (a gasket and a vent bushing). Cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. Cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, are forced out of the aperture to release pressurized gases from the cell 10.

Alternatively, a cell design which omits the ball vent in favor of a foil vent, as contemplated in U.S. Patent Publication No. 2005/0244706 (which is incorporated herein). Here, only a gasket is used, and the vent well, vent hole, bushing and vent ball are replaced by an impermeable foil or vapor barrier. All other parts of the cell remain the same, as do the construction and design principles discussed herein. The gasket of the present invention has equal applicability to the foil vent and ball vent designs. In the preferred embodiments of the invention and regardless of whether the member is a gasket or a bushing, the sealing member is tubular (i.e., a cylinder with an open, axial center) with an essentially circular cross sectional shape for ease of manufacture by injection molding.

The materials used for cell components depend in part on the cell type, including the electrochemistry. For lithium and lithium ion cells, there are many similarities in suitable materials. Ultimately, to the extent that the invention is most ideally suited to consumer-sized lithium batteries, particular emphasis should be placed on the availability, cost and ease of manufacture/handling these materials possess.

The gasket comprises an engineered thermoplastic material that is resistant to cold flow at high temperatures (e.g., 75°

C. and above), chemically stable (resistant to degradation, e.g., by dissolution or chemical reaction) when exposed to the internal environment of the cell and resistant to the transmission of air gases into and electrolyte vapors from the cell. Gaskets are preferably made from engineered thermoplastic resins that absorb electrolyte materials but resist permeation of the electrolyte therethrough.

The preferred polymeric sealing materials have diffusion kinetics and solubility that are conversely related, as expressed by the equation P=D×S, where permeability, P, is equal to the product of the diffusion, D, and solubility, S, coefficients. Notably, vapor transmission rate ("VTR") is another experimentally-derived metric indicative of the permeability of any given engineered thermoplastic.

Dynamic absorption experiments are also used to determine the diffusion coefficient for a material. The technique is based on classical diffusion theory of Fick's Law. Fick's Law states that the amount of a given material (Q) passing normally through a plane is proportional to the concentration gradient, according to the following equation, where C is the concentration of the diffusing material, x is the distance in the direction normal to the plane, and D is the diffusion coefficient:

$$Q = -D \frac{\partial C}{\partial x}$$

When D is assumed to be independent of concentration and when the flux is assumed to be one dimensional (approximated as a sheet), the mass absorbed at a given time ($M_t$), normalized to the equilibrium uptake ($M_\infty$), can be expressed as follows, where l is the distance measured outwards from the center of the sheet:

$$M_t / M_\infty = 2 \sqrt{\frac{Dt}{\pi l^2}}$$

Note that this equation for uptake equilibrium is semi-infinite and only applies at times near zero. Therefore, a plot of $M_t/M_\infty$ versus $t^{0.5}$ should generate a linear relationship at times before the equilibrium uptake has been reached. From the slope of this line (m), one can calculate the diffusion coefficient, which can be expressed as follows:

$$D = \pi \left( \frac{ml}{2} \right)^2$$

To measure this dynamic absorption experimentally, gaskets are submerged in an electrolyte, preferably containing an electrolyte with an all-ether solvent blend of DIOX and DME and a solute, such as LiI and/or lithium triflate. These gaskets remain submerged for predetermined times and at predetermined temperatures before being removed from the electrolyte filled vial, at which time excess electrolyte droplets are removed from the surface of the gaskets and then the gaskets are weighed. The weight gain is representative of the absorbed amount of electrolyte, and the equilibrium absorption is then reported as a percent weight gain for that particular material.

Figure 4A:
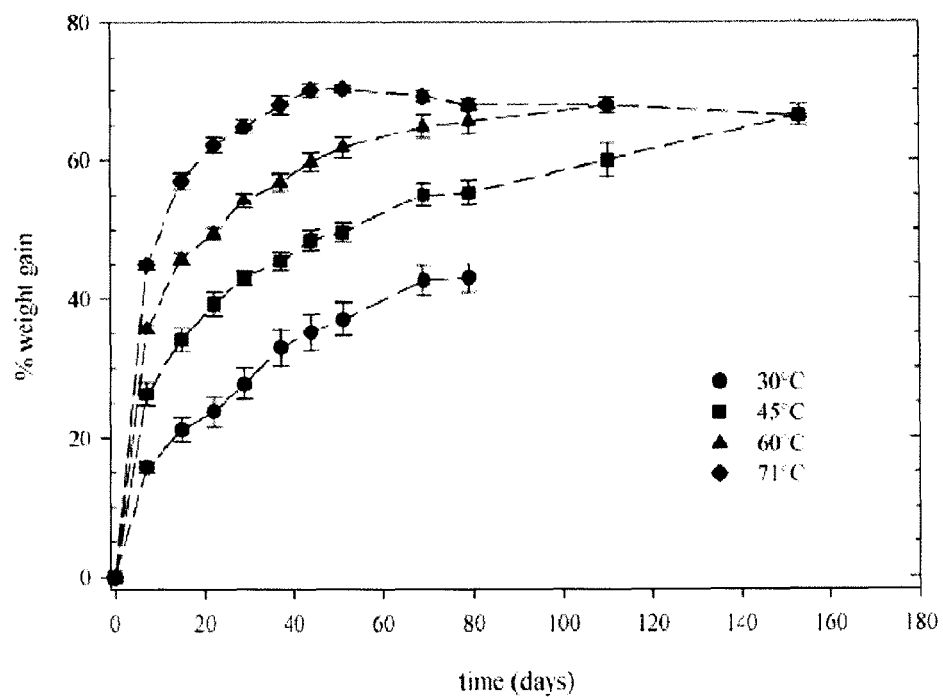
FIGS. 4A and 4B are exemplary plots of the absorption of a DIOX-DME-LiI based electrolyte solution by PPA and PP materials, respectively speaking, at various temperatures.
Figure 4B:
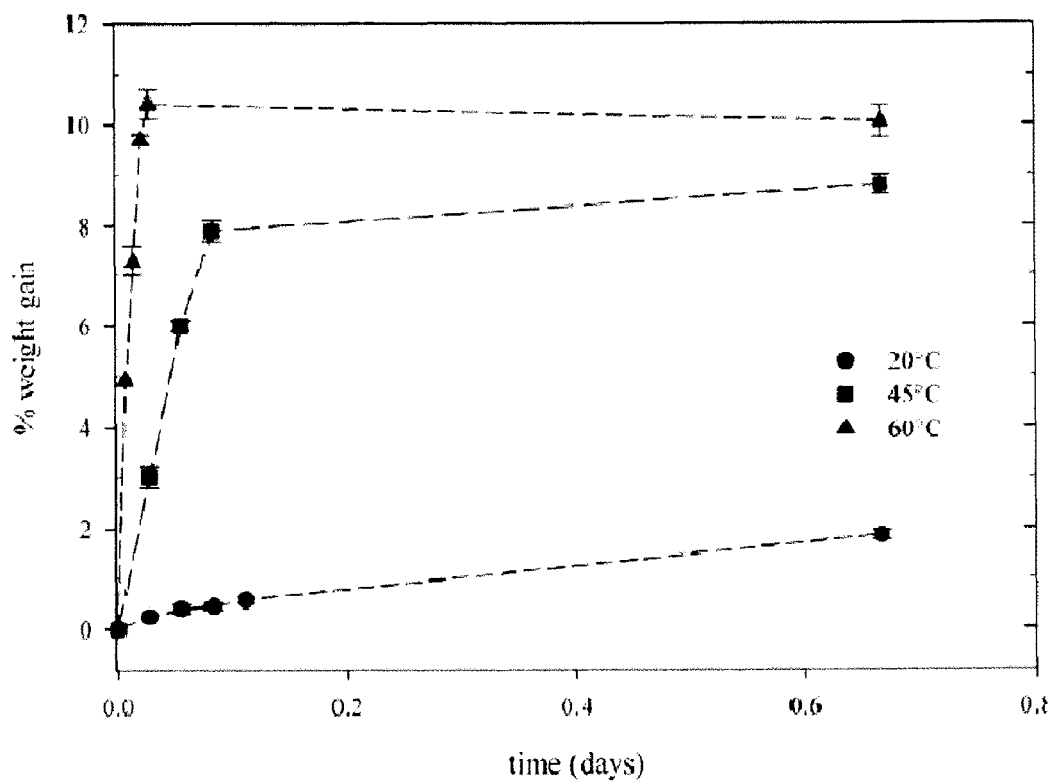

By way of example rather than limitation, FIGS. 4A and 4B show the dynamic absorption measurements of a 0.75 molal lithium iodide salt dissolved in 65:35:0.2 solvent blend of DIOX:DME: 3,5-dimethylisoxazole ("DMI") into PPA and PP materials, respectively. As shown in these figures, the amount of electrolyte absorption in PPA is significantly higher than PP, as the equilibrium absorption reaches 70% weight gain for PPA but only 10% for PP.

Another difference illustrated in FIGS. 4A and 4B is the rate at which PP and PPA are absorbed. FIG. 4A shows that at 60° C., PPA requires over 100 days to reach its equilibrium absorption. In contrast, FIG. 4B shows that PP requires only minutes to reach its equilibrium absorption. In fact, PP absorbs electrolyte so quickly that reliable measurements could not be obtained at 71° C.

Figure 5:
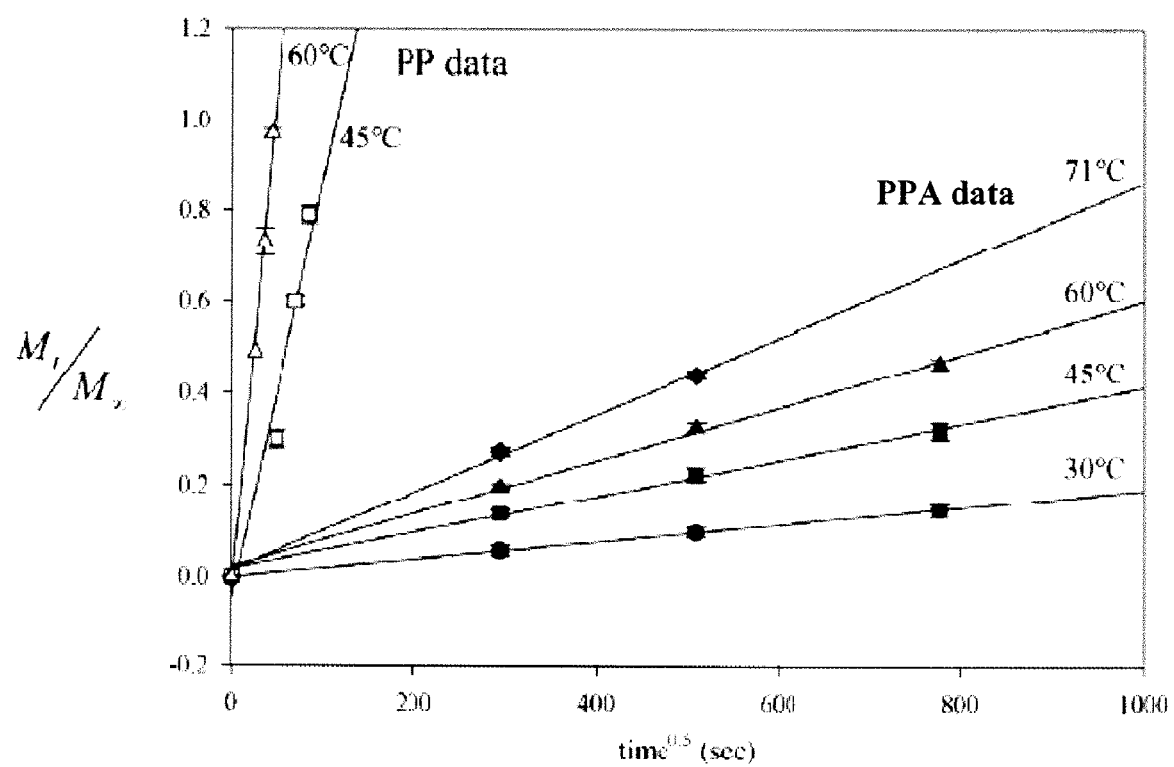
FIG. 5 is an exemplary plot of dynamic absorptions of PP and PPA materials in a DIOX-DME solution normalized to their equilibrium uptake, $M_\infty$, versus the square root of time.

The absorption rate differences are further analyzed with reference to FIG. 5, which plots the dynamic absorption data according to the $M_t/M_\infty$ relationship described above. In particular, the dynamic absorption data for PP at 45 and 60° C. is plotted against the same data for PPA. When shown in this manner, one can appreciate the large difference in absorption rate between PP and PPA. To the extent this plot is linear versus radical time, one can use this plot to calculate the diffusion coefficient, D, for the electrolyte being studied because the slope of the line, m, as contemplated in the foregoing equations.

Permeability can also be quantitatively measured via a standardized experimental regime and expressed as a Vapor Transmission Rate ("VTR"). In practice, a series of identical vials are filled with the electrolyte of interest and then fitted with individual membranes made from the various engineered thermoplastic materials of interest. The thickness of each membrane is measured/known, and each membrane is then affixed to its vial via a sealant and metal ring crimped around the edges in order to insure a hermetic seal. The metal ring includes an aperture of known diameter/surface area so as to leave a known surface area of the membrane exposed to the electrolyte vapors on one side and a controlled atmosphere on the opposite side. All of the vials are then stored under identical conditions, typically 71° C. and ambient pressure, and monitored for relative weight loss over a set period of time. Finally, based on these parameters, comparative VTR rates can be developed for the electrolyte/engineered thermoplastic combination.

Through judicious selection of engineered thermoplastic materials and control of the conditions under which the material(s) are molded or otherwise formed, even more control over the resultant sealing member's properties (either a gasket or a bushing) can be attained. By way of example rather than limitation, the properties of semi-crystalline engineered thermoplastics, such as PPS, depend on its level of crystallinity, which is dictated by the conditions of the molding process, especially the mold temperature. Often, high mold temperatures (e.g., >135° C. in the case of PPS) are needed to reach maximum crystallinity of such thermoplastics, but such high temperatures make injection molding of such parts impractical, if not impossible. In contrast, if the mold temperature occurs below the glass transition temperature (e.g., 85° C. in the case of PPS), the injection molding process for the part is effective but the plastic itself will have an amorphous structure that leads to unwanted softening of the material when the resultant part is exposed to high temperatures (e.g., >100° C. for a period of 5 hours) because the molten polymer is quenched so rapidly that the polymer chains do not have time to arrange into their preferred crystalline lattice. Therefore, to arrive at a sealing member with the desired levels crystallinity and processability, engineered thermoplastic parts can be injection molded and then annealed in order to create a semi-crystalline part. In doing so, the annealing temperature should nonetheless be minimized to lessen any potential thermal oxidative embrittlement of the bushing. This and similar processes are also known as "cold-crystallization," and such cold crystallized engineered thermoplastics and techniques can be used to achieve the desired levels of performance in terms of absorption and permeation, as described above.

Figure 6A:
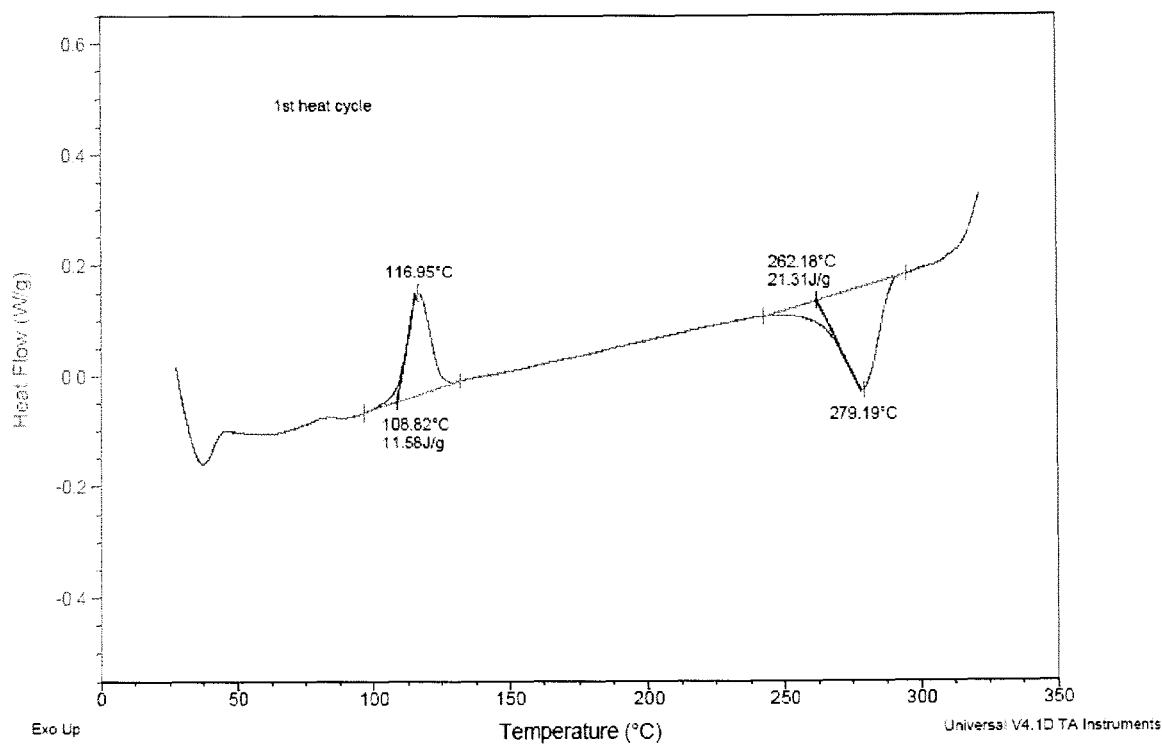
FIGS. 6A and 6B show the first and second heat cycles of a DSC thermogram for a PPS engineered thermoplastic having glass fiber and impact modifier.
Figure 6B:
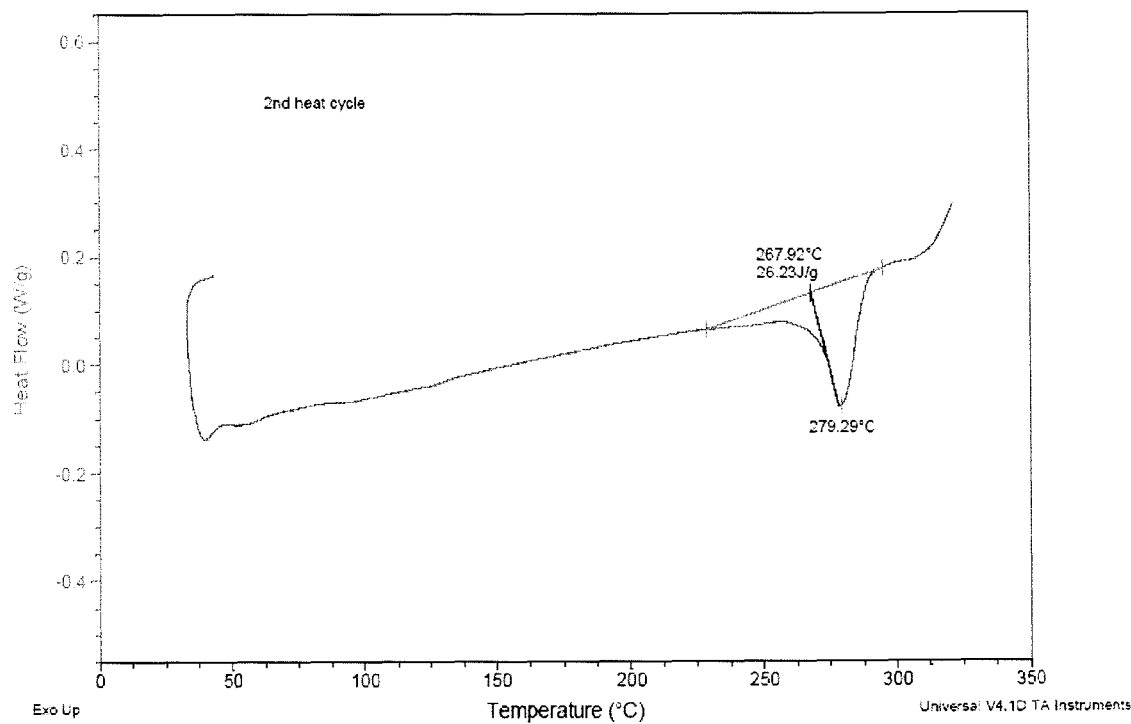

The annealing and semi-crystallinity of an engineered thermoplastic can be determined through any number of well known analytical techniques. For example, a comparative study of two separate heating cycles in a differential scanning calorimetry ("DSC") thermograms on PPS material, as seen in FIGS. 6A and 6B, is possible. FIG. 6A shows the first heating cycle of a DSC thermogram for a PPS part, including glass fiber and impact modifier, without any annealing. Note the exotherm at 117° C. and the endotherm at 279° C. that are present in FIG. 6A. The exotherm at 117° C. represents the annealing exotherm, where the polymer chains arrange into a crystalline form and release the latent heat of fusion associated with the liquid-solid phase change. Once the PPS reaches 117° C. the annealing process occurs quickly in light of the heating rate for this particular DSC thermogram (i.e., 10° C./min). The endotherm at 279° C. is the melting of the PPS crystalline domain. FIG. 6B shows the second heating cycle of the DSC thermogram of the same sample after it has been allowed to cool. Here, no annealing exotherm is found because the slow (10° C./min) rate of cooling after the first cycle allowed sufficient time for full crystallization to take place. Therefore, no crystallinity is left for annealing and the annealing exotherm is absent from FIG. 6B. X-Ray diffraction can also be used to confirm the amorphous state of such engineered thermoplastics.

In light of the foregoing, electrolyte absorption and VTR rates have been developed for the preferred ether electrolyte and materials which represent the currently known consumer battery-grade engineered thermoplastics. The data for each is set forth in Table 1 below.

TABLE 1

Absorption at 71° C. and VTR at 75° C. for
65:35:0.2 DIOX:DME:DMI electrolyte having 0.75 m LiI

| Material | Absorption (wt. %) | Vapor Transmission Rate (g * mil/ 100 in² * days) |
|---|---|---|
| PP | 8 | 700 |
| PBT | 6 | 370 |
| ETFE | 5 | 300 |
| ETFE + 25 wt. % glass fibers | 3 | 100 |
| PPS + <10 wt. % impact modifier + 30 wt. % glass fibers | 7 | 80 |
| PPS + ≧10 wt. % impact modifier | 10 | 100 |
| PPS + ≧10 wt. % impact modifier + 35 wt. % glass fibers | 11 | 360 |
| PPS + ≧10 wt. % impact modifier | 13 | 210 |
| PPA + ≧5 wt. % impact modifier | 70 | 70 |

Based upon subsequent experiments with actual full cell constructions, an engineered thermoplastic material must absorb at least 10 wt. % of an ether-based electrolyte (i.e., a solvent blend that is >50% ethers) while having a VTR of less than 500 in order to obtain the desired "wine cork" effect. More preferably, the absorption should be at least 12 wt. % and/or the VTR less than 300. Also, while a preferred combination has been identified (i.e., electrolyte containing at least one solute dissolved in a solvent blend consisting of at least 50% ethers), it is believed that similar experiments, conducted on the same materials but different specific electrolyte blends, would nevertheless yield the same benefits.

Without intending to be confined by any particular theory regarding why high absorption and low VTR is desirable in engineered thermoplastic sealing members according to this invention, it is believed that the excess "free" volume inherent in certain engineered thermoplastic material will provide more molecular scale porosity for passage of electrolyte vapors through the material, provided those vapors have the appropriate generic electrolyte solvent characteristics (to the extent the solute does not volatize, it is believed the solute choice has little to no affect on absorption or permeation). Mobility of the polymer chains may also play a role, insofar as the Activate State Theory applies. That is, the free volume involved in a given diffusional jump of a penetrant molecule must be supplied by a momentary fluctuation in the polymer segmental position due to local thermal fluctuations. Therefore, the ability of the polymer to provide segmental motion (polymer backbone movement of two to four monomer units, e.g. rotations around chain backbone bonds, torsional oscillations, etc.) will dramatically impact its ability to allow permeation of low molecular weight compounds.

The temperature at which absorption occurs is also important. A flexible or rubbery material will behave differently than one that is essentially in a rigid or glassy state. These two different states can be differentiated by their glass transition temperatures (Tg). The glassy state of a polymer occurs below its Tg, which immobilizes segmental motion. In the rubbery state (i.e., above Tg), local molecular motions are significantly enhanced. Therefore, more free volume and the rubbery state work together to provide a much higher level of diffusion for electrolyte into the material. The molding conditions for engineered thermoplastics can be manipulated accordingly to optimize this phenomenon.

Furthermore, the role of the electrolyte composition and its propensity to absorb but not permeate a specific material cannot be overlooked. The absorption and permeation tendencies of an electrolyte composition will vary depending on the engineered thermoplastic, primarily based on the solvent's boiling point and interactions with the other components in the electrolyte blend. However, from a battery performance perspective, the electrolyte composition must still consist of a solvent blend and solute that enables good high rate performance while avoiding unwanted reactions with the cell components. Given the number of engineered thermoplastics known to be compatible with the compatible organic solvents/solutes (as disclosed herein), and further considering the various types and amounts engineered thermoplastic additives (impact modifiers and thermal stabilizing fillers) along with potential further alterations by post-molding processes such as cold crystallization, there are potentially hundreds, if not thousands, of permutations to consider when selecting electrolyte/engineered thermoplastic pairings according to the invention, and the synergistic effects of any particular electrolyte and plastic combination must be verified experimentally.

Two preferred resins to make gaskets possessing the aforementioned properties are polyphenylene sulfide and polyphthalamide and combinations thereof as base resins. The base resin and can be blended with modifiers to provide the desired properties of absorption and vapor transmission. Small amounts of other polymers, reinforcing inorganic fillers and/ or organic compounds may also be added to the base resin of the gasket. A preferred base resin displaying the desired characteristics of absorption and vapor transmission is polyphthalamide. In one embodiment, polyphthalamide can be used alone. In another embodiment an impact modifier is added to the polyphthalamide. For example, from about 5 to 40 weight percent of an impact modifier can be added to the resin. An example of a suitable polyphthalamide resin is RTP 4000 from RTP Company, Winona, Minn., USA, another preferred material is available as AMODEL® ET 1001 L from Solvay Advanced Polymers, LLC, Alpharetta, Ga., USA.

Another preferred base resin is polyphenylene sulfide to which up to 40 weight percent of an impact modifier is added, along with optional amounts of thermal stabilizing fillers, preferably in the range of 20 to 40 weight percent when present. Appropriate materials may be available as FORTRON® SKX 382 from Ticona-US, Summit, N.J., USA, and/or as XTEL® XE 5300, XTEL® XE 3035 and XTEL® XE3200 from Chevron Phillips Chemical Company LLC, The Woodlands, Tex., USA.

To maintain the desired compression of the gasket between the container and cover, it is generally desirable to use gasket materials with relatively low coefficients of thermal expansion to minimize the effects of temperature. When the CTE is too high excessive overstress (resulting in excessive cold flow) can occur at high temperatures, and excessive contraction can occur at low temperatures. It is also preferable for the CTE's of the container, cell cover and gasket to be relatively close to one another so that dimensions of their interface surfaces will change by about the same amount in response to temperature changes, thereby minimizing the effects on gasket compression over a broad temperature range. The importance of the CTE's of the gasket, container and cell cover materials can be reduced by using a cell cover design like that shown in FIG. 1, where the cover has a generally vertical wall that has some radial spring characteristics.

Heat deflection temperature (HDT) is a measure of a resin's tendency to soften when subjected to heat. The higher the HDT, the more rigid the material remains when heated. Preferably the resin used to make the gasket has an HDT of at least 50, preferably at least 75 and more preferably at least 100° C. at a pressure of 18.56 kg/cm$^2$.

Creep strain rate is another measure of the material's tendency to soften when subjected to heat. The lower the creep strain rate, the more rigid the material remains when heated. When the creep strain rate is too high the material can flow excessively, resulting in a loss of compression of the gasket between the container and cell cover. Ideally the average creep strain rate of the resin is zero. An average creep strain rate of no greater than 0.01 percent/min. between 100 and 200 minutes at 85° C. with a constant applied force of 6 N is preferred. More preferably the average creep strain rate is no more than about 0.007 percent/min., and most preferably it is no more than about 0.004 percent/min. Most preferably the average creep strain rate is no more than 0.002 percent/min.

The gasket will also be resistant to the forces applied during and after cell manufacturing, when the gasket is initially compressed, to prevent damage, such as cracks through which electrolyte can leak. Impact modifiers can be included in the resin to increase the impact resistance of the material.

To further improve the seal at the interfaces between the gasket and the cell container and the cell cover, the gasket can be coated with a suitable sealant material. A polymeric material such as EPDM can be used in embodiments with an organic electrolyte solvent.

The vapor transmission rates of water and the electrolyte solvent should also be low to minimize the entry of water into the cell and loss of electrolyte from the cell. Water in the cell can react with the active materials, and the internal resistance of the cell can increase to an undesirable level if too much electrolyte solvent is lost.

The vent bushing is a thermoplastic material that is resistant to cold flow at high temperatures (e.g., 75° C. and above). This can be achieved by including more than 10 weight percent, preferably at least 15 percent, thermal-stabilizing filler in the thermoplastic material. Preferably no more than 40, more preferably no more than 35, weight percent thermal-stabilizing filler is added. The base resin of the thermoplastic material is one that is compatible with the cell ingredients (anode, cathode and electrolyte). The resin can be formulated to provide the desired sealing, venting and processing characteristics. The resin is modified by adding a thermal-stabilizing filler to provide a vent bushing with the desired sealing and venting characteristics at high temperatures.

The wall of the vent bushing between the vent ball and the vent well in the cover can be designed to be thin (e.g., 0.006 to 0.015 inch as manufactured) and compressed by about 25 to 40 percent when the bushing and ball are inserted into the cover.

Suitable polymeric resins for the vent bushing include ethylene-tetrafluoroethylene, polybutylene terephthlate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide (PPA) are preferred, especially for use in a cell with an electrolyte solvent containing a large percentage of highly volatile (high vapor pressure, low boiling point) ether compounds.

A suitable thermal-stabilizing filler is one which, when added to the thermoplastic resin, decreases the CTE of the resin by at least 20 percent and increases the HDT of the resin by at least 20° C. Such fillers may be inorganic materials, such as glass, clay, feldspar, graphite, mica, silica, talc and vermiculite, or they may be organic materials such as carbons. It may be advantageous for the filler particles to have a high average aspect ratio, such as fibers, whiskers, flakes and platelets.

Glass can be used as a thermal-stabilizing filler. A preferred type of glass is E-glass. The lengths of the glass fibers will affect the material properties to some extent, particularly the thermal and mechanical properties, more so than the thermal expansion. The fiber length can vary depending on the base resin use. For example, with PBT as the base resin, shorter fibers seem to work well, while with other base resins, longer fibers may be better. The glass fiber length can be controlled in any suitable manner. In general, milling produces shorter fibers than chopping.

In addition to thermal-stabilizing fillers, an impact modifier may also be added to the vent bushing material to increase its resiliency for manufacturing and/or operation. As with the gasket materials described above impact modifiers can also be used in some cases. Preferred materials displaying the desired absorption and vapor transmission rate characteristics are sold as XTEL® XE 5030 or XTEL® XE 3035 by Chevron Phillips Chemical Company LLC, The Woodlands, Tex., USA.

The vent bushing can be manufactured using any suitable process. Injection molding is an example. Because the length of the glass fibers in the thermoplastic material can be reduced during injection molding of the vent bushings, the possible effects on the vent bushing characteristics should be considered before using reground scrap from molding. The molding parameters used should be those that provide a smooth surface on the molded bushings (e.g., Society of the Plastics Industry Standard Surface Finish D3 or better). Molding parameters will vary with the type of material being molded, and the suppliers of such resins typically provide guidance on appropriate injection molding parameters. For the preferred PPS resins, the preferred changes to standard molding conditions are a mold temperature of about 38° C., followed by cold crystallization of the part at about 130° C. for approximately 60 minutes in the event a preferred form of the semicrystalline material is desired.

The mixture of base resin and filler used to make the vent bushing preferably has a heat deflection temperature (HDT) of at least 90° C. (preferably at least 150° C. and more preferably at least 190° C.) and a coefficient of thermal expansion (CTE) between 50 and 90° C. of no greater than $7.0 \times 10^{-5}$ (preferably no greater than $5.0 \times 10^{-5}$ and more preferably no greater than $3.0 \times 10^{-5}$) cm/cm/° C.

To maintain the desired compression of the bushing between the cover and vent ball, it is generally desirable to use materials for the vent bushing that have low coefficients of thermal expansion to minimize the effects of temperature. When the CTE is greater than $5.0 \times 10^{-5}$ cm/cm/° C., excessive overstress (resulting in excessive cold flow) can occur at high temperatures and excessive contraction can occur at low temperatures. Both of these undesirable conditions can result in insufficient compression in the vent bushing to provide a good seal against the cell cover and the vent ball, leading to loss of electrolyte from the cell, water ingress into the cell and opening of the pressure relief vent under normal storage and use conditions.

It is also preferable for the CTE's of the cell cover, vent ball and vent bushing to be close to one another so that dimensions of the cover, ball and bushing interface surfaces will change by about the same amount in response to temperature changes, thereby minimizing the effects on bushing compression over a broad temperature range.

The heat deflection temperature is a measure of the material's tendency to soften when subjected to heat. The higher the temperature, the more rigid the material remains when exposed to heat. When the HDT is too low the material can flow excessively at high temperatures, resulting in a loss of compression of the vent bushing between the cell cover and the vent ball.

Notably, while the discussion above is bifurcated into ideal materials for gaskets and vent bushings, these characteristics and engineering principles used in selecting a particular engineered thermoplastic are equally applicable to any and all sealing members utilized in non-aqueous cell designs. As an example, if a closure design is used that requires a higher HDT or a modified CTE, the material selection (including addition/removal of glass fibers or impact modifiers) for a gasket required in that design can be altered according to the teachings identified above as pertinent to the vent bushings. The same will hold true for virtually any engineered thermoplastic part that may be utilized.

The cell container is often a metal can with an integral closed bottom, though a metal tube that is initially open at both ends may also be used instead of a can. The can is generally steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 111 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The vent ball can be made from any suitable material that is stable in contact with the cell contents and provides the desired cell sealing and venting characteristic. Glasses or metals, such as stainless steel, can be used. The vent ball should be highly spherical and have a smooth surface finish with no imperfections, such as gouges, scratches or holes visible under 10 times magnification. The desired sphericity and surface finish depend in part on the ball diameter. For example, in one embodiment of a Li/FeS$_2$ cell, for balls about 0.090 inch (2.286 mm) in diameter the preferred maximum sphericity is 0.0001 inch (0.00254 mm) and the preferred surface finish is 3 microinches (0.0762 µm) RMS maximum. For balls about 0.063 inch (1.600 mm) in diameter, the preferred maximum sphericity is 0.000025 inch (0.000635 mm), and the preferred maximum surface finish is 2 microinches (0.0508 µm) RMS.

In one embodiment of an FR6 Li/FeS$_2$ cell according to FIG. 1, the upstanding side wall of the gasket is 0.0205 inch (0.521 mm) thick as manufactured. The diameters of the cell cover, gasket and crimped can are such that the gasket is compressed by about 30 percent of its original thickness to provide a good seal. The gasket is preferably coated with a sealant such as ethylene propylene diene terpolymer (EPDM), but other suitable sealant materials can be used. The initial vent bushing wall thickness is 0.0115 inch (0.292 mm). It is compressed by about 30 to 35 percent of its original thickness in the sealed cell. A sealant could be used between the vent bushing and the cell cover or between the vent bushing and the vent ball, or a sealant could be applied over the cover, bushing and ball to improve the seal, but preferably no sealant is used in order to avoid adversely affecting cell venting or the vent pressure.

An anode for a lithium cell contains lithium metal, often in the form of a sheet or foil. The composition of the lithium can vary, though the purity is always high. The lithium can be alloyed with other metals, such as aluminum, to provide the desired cell electrical performance. When the anode is a solid piece of lithium, a separate current collector within the anode is generally not used, since the lithium metal has a very high electrical conductivity. However, a separate current collector can be used to provide electrical contact to more of the remaining lithium toward the end of cell discharge. Copper is often used because of its conductivity, but other conductive metals can be used as long as they are stable inside the cell.

An anode for a lithium ion cell includes one or more lithium-intercalable materials (capable of insertion and deinsertion of lithium ions into their crystalline structure). Examples of suitable materials include, but are not limited to carbons (e.g., graphitic, mesophase and/or amorphous carbons), transition metal oxides (e.g., those of nickel, cobalt and/or manganese), transition metal sulfides (e.g., those of iron, molybdenum, copper and titanium) and amorphous metal oxides (e.g., those containing silicon and/or tin). These materials are generally particulate materials that are formed into the desired shape. Conductive materials such as metal, graphite and carbon black powders may be added to improve electrical conductivity. Binders may be used to hold the particulate materials together, especially in cells larger than button size. Small amounts of various additives may also be used to enhance processing and cell performance. The anode generally includes a current collector; copper is a common choice. The current collector may be a thin metal foil sheet, a metal screen, an expanded metal or one or more wires. The anode mixture (active material and other ingredients) can be combined with the current collector in any suitable manner. Coating and embedding are examples.

Because lithium and lithium alloy metals are typically highly conductive, a separate current collector within the anode is often unnecessary in lithium and lithium alloy anodes. When an anode current collector is required, as is often the case in lithium ion cells, the current collector can be made from a copper or copper alloy metal.

A cathode for a lithium cell contains one or more active materials, usually in particulate form. Any suitable active cathode material may be used. Examples include $FeS_2$, $MnO_2$, $CF_x$ and $(CF)_n$.

A cathode for a lithium ion cell contains one or more lithium-intercalated or lithium-intercalable active materials, usually in particulate form. Any suitable active lithium-intercalated or lithium-intercalable material may be used, alone or in combination with others. Examples include metal oxides (e.g., those of vanadium and tungsten), lithiated transition metal oxides (e.g., those including nickel, cobalt and/or manganese), lithiated metal sulfides (e.g., those of iron, molybdenum, copper and titanium) and lithiated carbons.

In addition to the active material, a cathode for a lithium or lithium ion cell often contains one or more conductive materials such as metal, graphite and carbon black powders. A binder may be used to hold the particulate materials together, especially for cells larger than button size. Small amounts of various additives may also be used to enhance processing and cell performance.

A cathode current collector may be required. Aluminum, copper and related alloys are all commonly used materials. Typically, the thickness of the collector is selected to provide the minimal tensile strength required for coating and manufacturing operations while still maximizing the amount of coating and electrochemically active materials that can be loaded on to the collector.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm² and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 µm thick, and more preferably no more than 22 µm thick, such as 20 µm or 16 µm. A high tensile stress is desirable, preferably at least 800, more preferably at least 1000 kilograms of force per square centimeter ($kgf/cm^2$). For an FR6 type cell the preferred tensile stress is at least 1500 $kgf/cm^2$ in the machine direction and at least 1200 $kgf/cm^2$ in the transverse direction, and for a FR03 type cell the preferred tensile strengths in the machine and transverse directions are 1300 and 1000 $kgf/cm^2$, respectively. Preferably the average dielectric breakdown voltage will be at least 2000 volts, more preferably at least 2200 volts and most preferably at least 2400 volts. The preferred maximum effective pore size is from 0.08 µm to 0.40 µm, more preferably no greater than 0.20 µm. Preferably the BET specific surface area will be no greater than 40 $m^2/g$, more preferably at least 15 $m^2/g$ and most preferably at least 25 $m^2/g$. Preferably the area specific resistance is no greater than 4.3 ohm-$cm^2$, more preferably no greater than 4.0 ohm-$cm^2$, and most preferably no greater than 3.5 ohm-$cm^2$. These properties are described in greater detail in U.S. Patent Publication No. 2005/0112462, which is hereby incorporated by reference.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness. Suitable separators with similar properties are also available from Entek Membranes in Lebanon, Oreg., USA.

Electrolytes for lithium and lithium ion cells are nonaqueous electrolytes. In other words, they contain water only in very small quantities (e.g., no more than about 500 parts per million by weight, depending on the electrolyte salt being used) as a contaminant. Suitable nonaqueous electrolytes contain one or more electrolyte salts dissolved in an organic solvent. Any suitable salt may be used, depending on the anode and cathode active materials and the desired cell performance. Examples include lithium bromide, lithium perchlorate, lithium hexafluorophosphate, potassium hexafluorophosphate, lithium hexafluoroarsenate, lithium trifluoromethanesulfonate and lithium iodide. Suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range.

While the electrical conductivity is relatively high compared to some other common solvents, ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. The electrolyte-cathode compatibility, coupled with the absorption and permeation characteristics of ethers with the engineered thermoplastics contemplated herein, also causes the Li/FeS$_2$ chemistry to derive the most benefit from this invention. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone. For the purposes of absorption and permeation in engineered thermoplastics according to this invention, the preferred ethers include DIOX and DME, provided in volume percentages ranging from 10:90 to 90:10, and more preferably between 25:75 and 65:35, DIOX:DME. Nominal amounts (e.g., <2 volume percent, and more preferably <0.2 volume percent) of an optional third solvent, such as DMI (or any of the other organic solvents identified herein), are also provided in a preferred electrolyte. The preferred solutes are lithium iodide, lithium triflate and combinations thereof, with between 0.75 and 1.25 molal of lithium iodide being preferred. Other known lithium solutes are also appropriate.

Specific anode, cathode and electrolyte compositions and amounts can be adjusted to provide the desired cell manufacturing, performance and storage characteristics. Preferably, the amounts of electrochemically active materials will be balanced as taught in U.S. Pat. Nos. 6,849,360 and 7,157,185, incorporated herein, so as to maximize the performance of the cell.

The invention is particularly useful for cells having electrolyte solvents with a very high level (e.g., a total of at least 80 volume percent) of ethers with very low boiling points (e.g., no greater than 90° C. at sea level). The advantage is even greater when the volume percent of ethers in the solvent is at least 90 percent, and even more so with at least 98 volume percent ethers in the solvent.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

The above description is particularly relevant to FR6 type cylindrical Li/FeS$_2$ cells with nonaqueous electrolytes and to pressure relief vents comprising an engineered thermoplastic gasket, bushing and vent ball. However, the invention may also be adapted to other types of cells, such as non-cylindrical (e.g., prismatic) cells, cells with other active materials, cells with other electrolyte solvents (e.g., water) and cells with other pressure relief vent designs, including foil vent-type designs. For example, the aperture and pressure relief vent can be located in a cell cover or the container. The aperture can be defined by a uniform opening, such a straight cylindrical opening, or it may be nonuniform, with a reduced diameter opening in one section, such as the aperture in the cell cover in FIG. 1. The seal member sealing the aperture in the housing can be an engineered thermoplastic plug, or it can be a bushing into which a plug is inserted. The plug can be of any suitable solid shape, including but not limited to, a sphere, an ellipsoid, an ovoid and a cylinder. Cells according to the invention preferably have spiral wound electrode assemblies such as that shown in FIG. 1, another electrode configuration, such as folded strips, stacked flat plates, bobbins and the like.

The invention and its features and advantages are further illustrated in the following examples.

EXAMPLE 1

Gaskets for FR6 type cells similar to the gasket shown in FIG. 1 were injection molded from polypropylene homopolymer (PROFAX® 6524), polybutylene terephthlate (VALOX® 310), ethylene tetrafluoroethylene copolymer (TEFZEL® 2185), polyphenylene sulfide with 15 weight percent impact modifier (FORTRON® SKX 382) and polyphthalamide with 10-30 weight percent impact modifier (AMODEL® ET 1001 L).

FR6 type cells were also made according to FIG. 1 and the above description. The cells had the following features (quantitative values are design averages):

can material—diffusion annealed, low carbon, aluminum killed, SAE 1006 steel; ASTM 9 to 11 grain size, equiaxed to slightly elongated shape; nickel plated; about 0.010 inch (0.254 mm) thick, to provide a 0.0095 inch (0.241 mm) thick can wall;

can CTE about $1.25 \times 10^{-5}$ cm/cm/° C.;

cell cover material—0.013 inch (0.330 mm) thick type 304 soft annealed stainless steel; ASTM 8-9 grain size; post-plated with nickel;

cell cover CTE—$1.72 \times 10^{-5}$ cm/cm/° C.;

cell cover vent well inside diameter—0.105 inch (2.67 mm);

gasket material—varies per example but using the materials identified above;

gasket wall thickness—0.0205 inch (0.521 mm);

gasket sealant coating material—EPDM with 56% ethylene and 9% diene;

gasket compression—about 32 percent of the initial gasket wall thickness;

vent ball material (if present)—440C stainless steel (per ASTM A276);

vent ball surface finish (if present)—3 microinches (0.0762 μm) RMS max;

vent ball sphericity (if present)—0.0001 inch (0.00254 mm) max;

vent ball CTE (if present)—$1.02 \times 10^{-5}$ percent per degree C.;

vent ball diameter (if present)—0.090 inch (2.29 mm);

electrolyte composition—9.14 wt % LiI solute in a solvent blend of 63.05 wt % 1,3-dioxolane, 27.63 wt % 1,2-dimethoxyethane and 0.18 wt % 3,5-dimethylisoxazole;

electrolyte quantity—1.6 g;

cell internal void volume—10 percent;

vent bushing material (if present)—ETFE with no filler;

vent bushing wall thickness (if present)—0.0115 inch (0.292 mm); and vent bushing compression (if present)—about 32 percent of the bushing wall thickness.

Samples of both undischarged and fully discharged FR6 cells having the PP gasket were tested on a thermal shock test. The fully discharge cells were prepared by continuously discharging at 200 mA to a discharge voltage of 0.5 volt. In the thermal shock test, cells were stored for 6 hours at 75° C., followed by storage for 6 hours at −40° C.; this was repeated 10 times, with no more than 30 minutes between the test temperature extremes. After temperature cycling the cells were stored for 24 hours at room temperature. Each cell tested was weighed before and after testing to determine the total weight loss, including weight loss around and through the vent bushing as well as weight loss around and through the gasket. Each cell was also examined to determine if the cell had vented during the test. Sixteen percent of the undischarged cells and 58 percent of the fully discharged cells vented during the test. Of the cells that did not vent, the average weight loss during the test attributed to the vent bushing was about 23.7 mg for the undischarged cells and about 1.7 mg for the fully discharged cells.

EXAMPLE 2

FR6 type cells were made according to FIG. 1 and the above description, except that the cell covers (14) did not have vent holes (30), so vent bushings and vent balls were not used. These cells were then tested to determine the amount of weight loss during storage at reduced pressure followed by thermal shock. Some cells with each gasket type were tested in an upright orientation (as shown in FIG. 1), and others were inverted.

Cells were first stored for about 6 hours at room temperature and a pressure of about 11.6 kPa; weight loss was not significant. In the thermal shock portion of the test, cells were stored for 6 hours at 75° C., followed by storage for 6 hours at −40° C.; this was repeated 10 times, with no more than 30 minutes between the test temperature extremes; after temperature cycling the cells were stored for 24 hours at room temperature. For three of the gasket types (PP, PPS and PPA), three lots of cells, made at different times, were tested; for the other two gasket types (PBT and ETFE), only one lot of each was made and tested. The change in mass was determined for each cell. The average weight loss results are summarized in Table 2 for each cell lot. The average weight loss was better for cells with PBT, ETFE, PPS and PPA gaskets than for cells with PP gaskets, with cells made with PBT and PPA gaskets being the best overall. There was no substantial difference in average weight loss due to cell orientation during the test.

TABLE 2

| | Gasket Type | | | | |
|---|---|---|---|---|---|
| | PP | PBT | ETFE | PPS | PPA |
| Average Weight Loss (g) | 0.0081 | — | — | 0.0099 | 0.0000 |
| | 0.0079 | — | 0.0032 | 0.0104 | 0.0012 |
| | 0.0090 | 0.0010 | — | 0.0059 | 0.0010 |

EXAMPLE 3

Cells from Example 2 were stored for 3 weeks at 85° C. and then weighed to determine the amount of additional weight loss after storage at 85° C. Some cells were stored in an upright orientation (as shown in FIG. 1), and others were inverted. The average weight losses are shown for each lot of cells with PP, ETFE and PPA gaskets in Table 3. The average additional weight loss was significantly less for cells with ETFE, PPS and PPA gaskets than for cells with PP gaskets. Some of the cells with each gasket type were autopsied and examined. The PBT gaskets had cracks on the surfaces that had been exposed to the electrolyte in the cells, indicating degradation of the material.

TABLE 3

| | Gasket Type | | | |
|---|---|---|---|---|
| | PP | ETFE | PPS | PPA |
| Average Weight Loss (g) | 0.0700 | — | 0.0328 | 0.0018 |
| | 0.0748 | 0.0093 | 0.0368 | 0.0005 |

EXAMPLE 4

Gaskets made with different grades of PBT were submerged in various solutions at 70° C. and examined periodically to determine the source of the cracking observed in Example 3. The results are summarized in Table 4; "fail" indicates cracking after 7 days or less, and "pass" indicates no cracking after 60 days. Gaskets with all PBT grades tested failed when tested in the electrolyte used in the cells in Example 1. Gaskets did not fail when tested in solutions that did not contain both lithium and iodide ions in a nonaqueous solvent.

TABLE 4

| Solute Type and Concentration (moles/liter solvent) | Solvent Components and Volume Ratio | Gasket Material | Results |
|---|---|---|---|
| Li I 0.75 | DIOX:DME:DMI 65:35:0.2 | VALOX ® 310 | fail |
| Li I 0.75 | DIOX:DME:DMI 65:35:0.2 | CELANEX ® 1600A | fail |
| Li I 0.75 | DIOX:DME:DMI 65:35:0.2 | VALOX ® HR326 | fail |
| Li I 0.75 | DIOX:DME 65:35 | CELANEX ® 1600A | fail |
| none | DIOX:DME:DMI 65:35:0.2 | VALOX ® 310 | pass |
| none | DIOX:DME:DMI 65:35:0.2 | CELANEX ® 1600A | pass |
| LiCF$_3$SO$_3$ 1.0 | DIOX:DME:DMI 65:35:0.2 | CELANEX ® 1600A | pass |
| KI saturated | DIOX:DME:DMI 65:35:0.2 | CELANEX ® 1600A | pass |
| NaI 0.75 | DIOX:DME:DMI 65:35:0.2 | CELANEX ® 1600A | pass |
| LiI 0.75 | distilled water | CELANEX ® 1600A | pass |

EXAMPLE 5

Tables 5 shows properties of materials used in Example 1. Table 5 shows typical CTE, HDT and toughness characteristics for the grades of PP, PBT, PPS and PPA shown, where available.

TABLE 5

| Material Type | Material Grade | CTE (cm/cm/° C.) × 10$^{-5}$ | HDT at 18.56 kg/cm$^2$ (° C.) | Toughness (Joules/m) |
|---|---|---|---|---|
| PP | PRO-FAX ® 6524 | — | — | 37 |
| PBT | VALOX ® 310 | 8.1 | 54 | 54 |
| ETFE | TEFZEL ® HT2185 | 12.6 | 74 | (no break) |
| PPS | FORTRON ® SKX 382 | 8.4 | 82 | 507 |

TABLE 5-continued

| Material Type | Material Grade | CTE (cm/cm/° C.) × 10⁻⁵ | HDT at 18.56 kg/cm² (° C.) | Toughness (Joules/m) |
|---|---|---|---|---|
| PPA | AMODEL® ET 1001 L | 7.5 | 120 | 960 |

EXAMPLE 6

Figure 3:
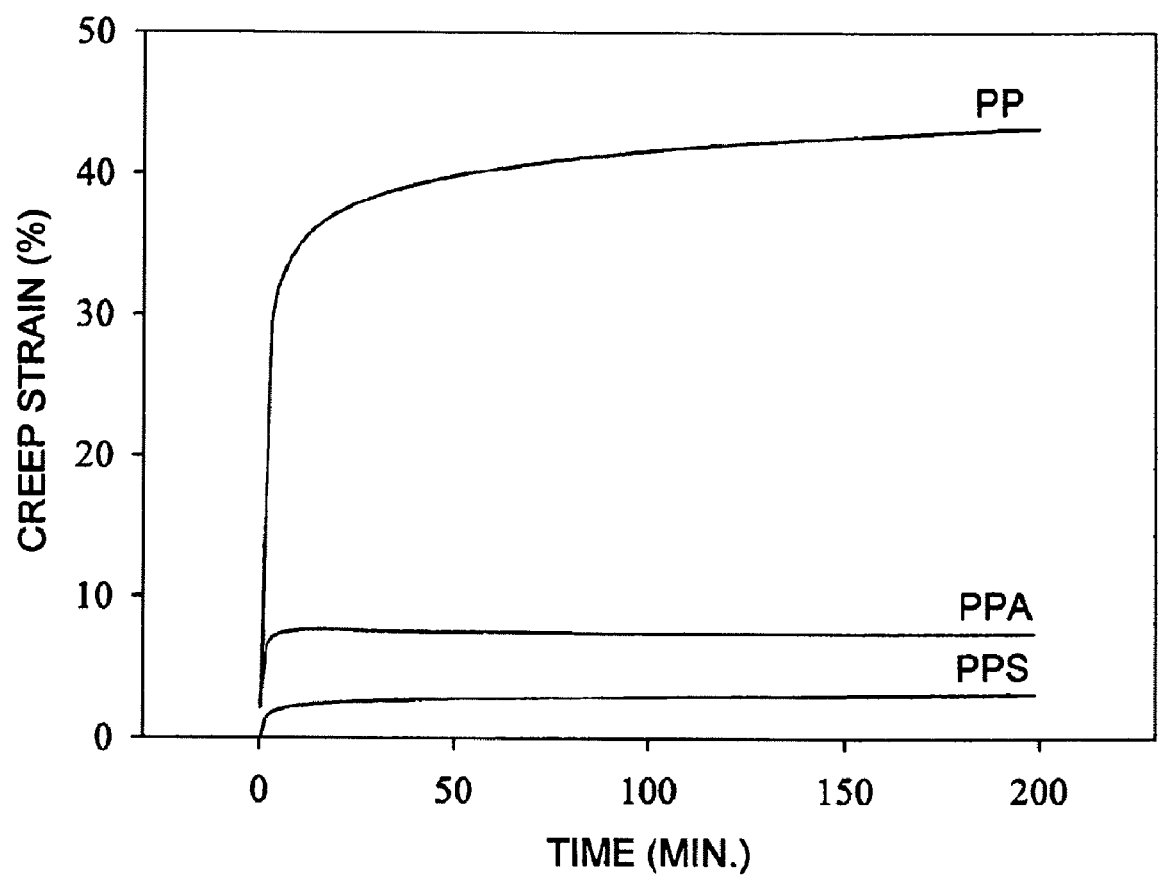
FIG. 3 is a graph showing creep strain as a function of time for three resin types at 85° C., with an initial applied stress of 10,000 kPa.

Test samples made from the PP, PPS and PPA resins used in Example 1 were tested at 85° C. to determine the tensile creep strain rate of those resins. The testing was done using a Tritec 2000 DMA (Triton Technologies, Ltd., UK). The test samples were made by compression molding the virgin resin to form a 0.25 mm thick film and then cutting individual samples 2.3 mm wide. An initial gauge length of 2.0 mm was used, and a constant tensile force of 6 N (tensile stress of 10,000 kPa) was applied. The results are plotted in the graph in FIG. 3, which shows the percent creep stain as a function of time. After application of the initial tensile stress, a flat line indicates a creep strain rate of zero (i.e., no material flow). The average creep strain rate for a given time interval (e.g., between 100 and 200 minutes) is calculated by subtracting the creep strain at 100 min. from the creep strain at 200 min. and dividing the difference by 100 min. The creep strain values at 100 and 200 minutes and the average creep strain rate are shown in Table 7. The average creep strain rates of the PPS and PPA materials were substantially better than that of PP, with PPA being the best.

TABLE 6

| Material Type | Material Grade | Creep Strain at 100 min. (%) | Creep Strain at 200 min. (%) | Ave. Creep Strain Rate (%/min.) × 10⁻³ |
|---|---|---|---|---|
| PP | PRO-FAX® 6524 | 41.7 | 43.2 | 15 |
| PPS | FORTRON® SKX 382 | 2.9 | 3.2 | 3 |
| PPA | AMODEL® ET 1001 L | 7.4 | 7.4 | 0 |

EXAMPLE 7

Other thermoplastic materials were considered as possible substitutes for ETFE to make vent bushings for the FR6 cells in Example 1.

Table 7 shows CTE, HDT and mold shrinkage characteristics provided by suppliers of a number of thermoplastic materials. For the materials in Table 7, the CTE and HDT values for the glass filled resins are generally more suitable than those for unfilled resins for use in making seal members. The electrolyte transmission rates through unfilled ETFE and PBT are similar, and adding 15-25 weight percent glass filler to these resins can substantially reduce the electrolyte vapor transmission rate at high storage temperatures. Other material properties can also affect the vapor transmission rate, as evident in comparing the results for VALOX® DR51 and LNP WF1004M.

TABLE 7

| | Glass Filler | | Thermoplastic | CTE | HDT at | Mold Shrinkage (in./in. × 10⁻³) | |
|---|---|---|---|---|---|---|---|
| Base Resin | (wt. %) | length (μm) | Material Grade | (% × 10⁻⁵ per ° C.) | 264 psi (° C.) | (flow direction) | (transverse direction) |
| EFTE | 0 | — | TEFZEL® HT2185 | 9.3 | 74 | 12 | 28 |
| EFTE | 16 | 73§ | LNP FP1004M | | 107 | | |
| EFTE | 25 | 290† | TEFZEL® HT2004 | 1.7 | 210 | 10 | 18 |
| PBT | 0 | — | VALOX® 310 | 14 | 54 | 19 | 20 |
| PBT | 0 | — | VALOX® 365 | 7.9 | 121 | 12 | 14 |
| PBT | 15 | 548† | VALOX® DR51 | 2.2 | 191 | 6 | 11 |
| PPS | 40 | | RYTON® R-4-230NA | 1.5 | 260 | | |

§ = milled fibers
† = chopped fibers

Figure 2:
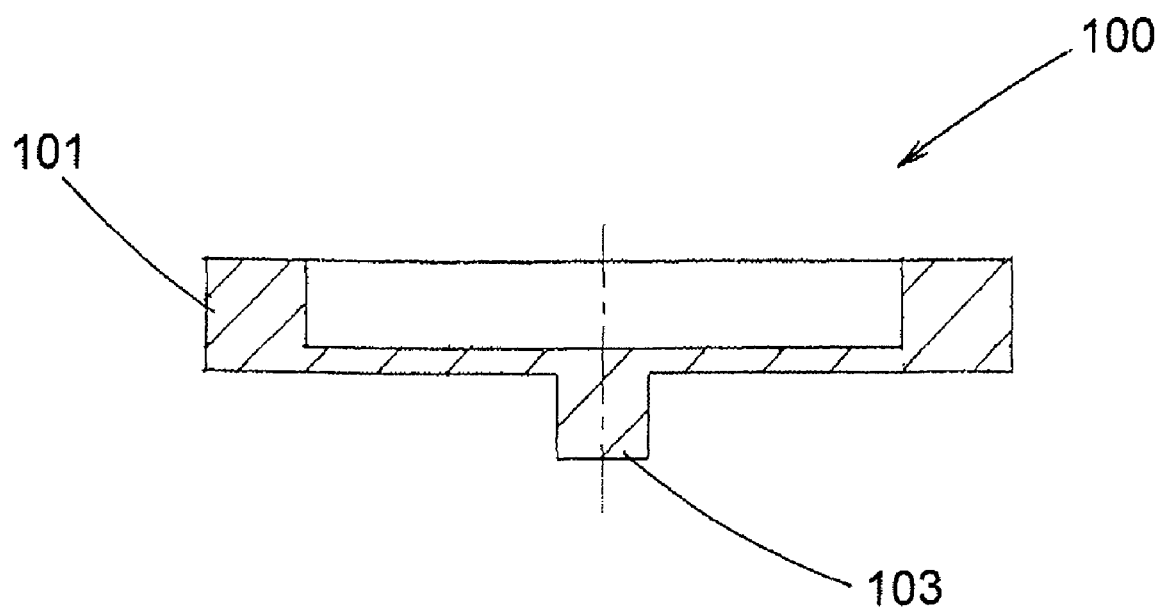
FIG. 2 is a cross-sectional view of a test membrane for a vapor transmission rate test.

Table 8 shows the vapor transmission rates of water and the desired organic electrolyte (9.14 wt % LiI solute in a solvent blend of 63.05 wt % 1,3-dioxolane, 27.63 wt % 1,2-dimethoxyethane and 0.18 wt % 3,5-dimethylisoxazole) through a number of thermoplastic materials at different temperatures. The vapor transmission rates were determined using the following method, adapted from ASTM E96-80 (Standard Test Method for Water Vapor Transmission of Materials):

1. mold a thermoplastic test membrane according to the membrane 100 in FIG. 2, where the height, outside diameter and inside diameter at wall 101 are suitable for providing a seal between the bottle and seal in steps 2 and 5 below, the membrane thickness between wall 101 and hub 103 is 0.020 inch (0.508 mm) and the test surface area (step 9 is the surface area of the membrane between wall 101 and hub 103 [for the serum bottle and seal described in the examples in steps 2 and 5 below, a suitable test membrane has a wall outside diameter of 0.770 inch (19.56 mm), a wall inside diameter of 0.564 inch (14.33 mm), a hub diameter of 0.127 inch (3.23 mm), a hub length of 0.075 inch (1.91 mm) below the lower test surface and a test surface area of 0.237 in.² (1.529 cm²)];
2. put about 8 ml of liquid (water or electrolyte) into a 15 ml bottle (e.g., Wheaton Serum Bottle, 25 mm diameter×54 mm high, Cat. No. 06-406D);

3. apply sealant (e.g., G.E. Silicone II for testing at up to 60° C.; vacuum grease for testing at up to 75° C.) to the lip of the bottle;
4. place the test membrane over the top of the bottle;
5. place a seal with a ⅝ inch (15.88 mm) diameter center hole (e.g., Wheaton Aluminum Seal Cat. No. 060405-15) over the test membrane and crimp the seal tightly onto the bottle;
6. weigh the sealed bottle;
7. store the bottle at the desired test temperature and reweigh (at room temperature) at regular intervals (e.g., monthly for 6 months at room temperature; daily for 2 weeks at 60° C. and 75° C.);
8. determine the total weight loss (use a negative value to indicate a weight gain) over the test period;
9. calculate the vapor transmission rate in g·0.001 in./day·100 in.$^2$ (g·0.0254 mm/day·0.65416 cm$^2$) using the average total weight loss from step 8 (excluding any individual samples that are extremely high due to loss of seal) and the formula [(ave. weight loss in grams/day) (membrane thickness in inches/1000)(100)/(test surface area of membrane)], where day=24 hours; and
10. perform steps 2-9 on an empty bottle, and correct the calculated vapor transmission rate for the test liquid by subtracting the result from step 9 for the empty bottle from the result from step 9 for the bottle containing the test liquid.

plastic materials were filled with glass fibers. The TEFZEL® HT2185 material contained 75 weight percent regrind. The other materials were 100 percent virgin, with no regrind. The bushings made from RYTON® PR09-60 and R-4-230NA were not acceptable for use in cells. The RYTON® PR09-60 would not properly fill the mold during molding and the bushings molded from the RYTON® R-4-230NA had weak weld lines, indicating that either modification of the resins to improve molding or changes in molding parameters would be necessary in order to produce suitable bushings.

EXAMPLE 9

Vent bushings from Example 4 made with TEFZEL® 2185, TEFZEL® HT2004 and VALOX® DR51 were used to make FR6 cells that were otherwise like the FR6 cells in Example 1.

Undischarged samples of the FR6 cells were tested on the thermal shock test described in Example 1. The at the cell cover apertures (i.e., through and around the vent bushings are summarized in Table 9.

Those lots with vent bushings made from glass-filled ETFE and PBT had lower average weight losses than lots with bushings made with the unfilled resins. Lot D1 performed the best, with only 0.5 mg of weight loss during the thermal cycling test.

TABLE 8

| Base Resin | Glass Filler (wt. %) | avg. length (μm) | Thermoplastic Material Grade | Vapor Transmission Rate (g · 0.0254 mm/day · 0.65416 cm$^2$) | | | | | |
|---|---|---|---|---|---|---|---|---|---|
| | | | | Water | | | Electrolyte | | |
| | | | | room temp. | 60° C. | 75° C. | room temp. | 60° C. | 75° C. |
| PP | 0 | — | PRO-FAX ® 6524 | 0.2 | 7 | 18 | 8 | 437 | 1394 |
| EFTE | 0 | — | TEFZEL ® HT2185 | 0.6 | 7 | 20 | 6 | 140 | 314 |
| EFTE | 25 | 290 | TEFZEL ® HT2004 | 0.7 | 4 | 13 | 5 | 48 | 173 |
| PBT | 0 | — | VALOX ® 310 | 1 | 11 | 35 | 4 | 129 | 372 |
| PBT | 15 | 548 | VALOX ® DR51 | 1 | 11 | 27 | 7 | 52 | 155 |
| PBT | 16 | | LNP WF1004M | 0.7 | 10 | 28 | 5 | 115 | 312 |

The PP material had the lowest water vapor transmission rate at room temperature, but its electrolyte vapor transmission rate at 60° C. and 75° C. was much higher than any of the others. The electrolyte vapor transmission rates for the PPS and PPA materials were substantially lower than those of PBT and ETFE.

EXAMPLE 8

Vent bushings were injection molded from TEFZEL® 2185, TEFZEL® HT2004, VALOX® DR51, RYTON® PR09-60 and RYTON® R-4-230NA. The TEFZEL® resins were obtained from E. I. duPont de Nemours & Co. (Wilmington, Del., USA), the VALOX® & materials were obtained from G.E. Plastics, General Electric Company (Pittsfield, Mass., USA), the RYTON® materials were obtained from Chevron Phillips Chemical Company, LP (Houston, Tex., USA) and the other materials were custom blended by LNP Engineering Plastics (Exton, Pa., USA). The filled thermo-

TABLE 9

| Lot | Bushing Material Type | Bushing Material Grade | Ave. Weight Loss (mg) |
|---|---|---|---|
| A1 | Unfilled ETFE | TEFZEL ® 2185 | 38.5 |
| A2 | Unfilled ETFE | TEFZEL ® 2185 | 15.6 |
| B1 | ETFE with 25% Glass | TEFZEL ® HT2004 | 5.5 |
| B2 | ETFE with 25% Glass | TEFZEL ® HT2004 | 4.9 |
| C2 | Unfilled PBT | VALOX ® 365 | 1127.6 |
| D1 | PBT with 15% Glass | VALOX ® DR51 | 0.5 |
| D2 | PBT with 15% Glass | VALOX ® DR51 | 7.2 |

Samples of the FR6 cells were also tested to determine the average vent pressures—at room temperature, at 75° C., and at room temperature following the thermal shock test. The results are summarized in Table 10.

TABLE 10

| Lot | Bushing Material Type | Bushing Material Grade | Vent Pressure [psi (kg/cm$^2$)] | | |
|---|---|---|---|---|---|
| | | | At Room Temp. | At 75° C. | At Room Temp. after Thermal Shock |
| A | Unfilled ETFE | TEFZEL® 2185 | 846 (59.5) | 596 (41.9) | 199 (14.0) |
| B | ETFE with 25% Glass | TEFZEL® HT2004 | 955 (67.1) | 775 (54.5) | 315 (22.1) |
| C | Unfilled PBT | VALOX® 365 | 1175 (82.7) | 757 (53.2) | 462 (32.5) |
| D | PBT with 15% Glass | VALOX® DR51 | 1170 (82.3) | 926 (65.1) | 1299 (91.3) |

To prevent cell venting under normal operating conditions, FR6 cells made as described in Examples should have minimum vent pressures above 100 psi (7.0 kg/cm$^2$) at room temperature and above 135 psi (9.5 kg/cm$^2$) at 75° C. With both ETFE and PBT as the base resin, the addition of glass filler did not result in a substantially lower vent pressure at room temperature, and it increased the average vent pressure at 75° C. and at room temperature following the thermal shock test to provide greater assurance that cells would not vent during storage and normal use.

Although the present invention has been described in considerable detail with reference to certain preferred versions thereof, other versions are possible. Therefore, the spirit and scope of the appended claims should not be limited to the description of the preferred versions contained herein.

Each feature disclosed in this specification (including the accompanying claims, abstract, and drawings) is one example only of a generic series of equivalent or similar features, and each of the features disclosed may be replaced by alternative features serving the same, equivalent or similar purpose, unless expressly stated otherwise.

I claim:

1. A lithium iron disulfide battery comprising:
   a jellyroll electrode assembly comprising an anode consisting of lithium or a lithium alloy, a cathode including iron disulfide coated onto a current collector and a separator disposed between the anode and the cathode;
   an electrolyte consisting essentially of one or more organic solvents and at least one solute dissolved therein, said one or more organic solvents including at least 50 volume percent of one or more ethers;
   a housing;
   a closure assembly affixed over an opening in the housing; and
   at least one sealing member disposed between the housing and the closure assembly, said sealing member made from an engineered thermoplastic comprising PPS mixed with at least 10 weight percent of a thermal stabilizing filler;
   wherein the engineered thermoplastic has an absorption at 71° C. greater than or equal to 10 weight percent and a vapor transmission rate of less than 500(g×mil)/(100 in$^2$×day), said absorption and vapor transmission rate both relative to the electrolyte.

2. The battery of claim 1 wherein the one or more ethers are selected from the group consisting of: 1,2-dimethoxyethane, 1,2-diethoxyethane, di(methoxyethyl)ether, triglyme, tetraglyme, diethyl ether, 1,3-dioxolane, tetrahydrofuran, 2-methyl tetrahydrofuran, 3-methyl-2-oxazolidinone and combinations thereof.

3. The battery of claim 2 wherein the electrolyte consists of at least 90 volume percent of the one or more ethers.

4. The battery of claim 2 wherein the at least one solute selected from the group consisting of: lithium bromide, lithium perchlorate, lithium hexafluorophosphate, potassium hexafluorophosphate, lithium hexafluoroarsenate, lithium trifluoromethanesulfonate, lithium iodide and combinations thereof.

5. The battery of claim 1 wherein the engineered thermoplastic is PPS with between 10 and 40 weight percent of an impact modifier and between 0 and 35 weight percent of a thermal stabilizing filler.

6. The sealing member of claim 5 wherein the engineered thermoplastic is semi-crystalline.

* * * * *